United States Patent [19]

Silvey

[11] Patent Number: 4,522,087
[45] Date of Patent: Jun. 11, 1985

[54] SAW CHAIN DEPTH GAUGE GRINDER

[76] Inventor: Elmer R. Silvey, 1231 Dutton Rd., Eagle Point, Oreg. 97524

[21] Appl. No.: 544,435

[22] Filed: Oct. 21, 1983

[51] Int. Cl.³ .............................................. B23D 63/16
[52] U.S. Cl. ........................................ 76/25 A; 76/42
[58] Field of Search ............................ 76/25 A, 37, 42

[56] References Cited

U.S. PATENT DOCUMENTS

| 3,717,051 | 2/1973 | Silvey | 76/37 |
| 3,796,113 | 3/1974 | Granberg | 76/25 A |
| 4,002,089 | 1/1977 | Granberg | 76/25 A |
| 4,267,751 | 5/1981 | Ziegelmeyer | 76/25 A |

*Primary Examiner*—Roscoe V. Parker
*Attorney, Agent, or Firm*—Klarquist, Sparkman, Campbell, Leigh & Whinston

[57] ABSTRACT

A machine for grinding the depth gauges of saw chain cutter links includes a saw chain carrier mounted for movement toward and away from a power grinding element. As the carrier moves a cutter link toward the grinding element, the cutter tooth of such link moves beneath a shield plate which then moves with the carrier toward the grinding element. Upon continued movement, the shield plate contacts an indexing roller which forces the plate down against the top of the tooth. After the plate bottoms against the tooth, the plate forces the indexing roller upwardly. The roller, being linked to the grinding element, lifts the grinding element to its grinding position for grinding the depth gauge of such link. The bottom surface of the shield plate is sloped upwardly in a direction rearwardly from the top cutting edge of the cutter tooth, and the carrier is provided with an adjustable chain stop to dispose the cutter link at an angle to the shield plate and thereby provide for an automatic increase in depth gauge clearance as the length of the cutter tooth decreases. The shield plate can also be sloped laterally to cause the depth gauges on the right-hand cutter links to be ground to a different clearance than those on the left-hand cutter links, if desired. An alternative embodiment includes a brake activated by the carrier to hold the grinding element in its grinding position after the cutter tooth passes beneath the indexing roller.

18 Claims, 16 Drawing Figures

SAW CHAIN DEPTH GAUGE GRINDER

BACKGROUND OF THE INVENTION

The present invention relates to machines for grinding saw chains and more particularly to a machine for grinding the depth gauges of saw chain cutter links.

Saw chains typically include alternating right- and left-hand cutter links of similar but opposite configuration interconnected by drive links and tie straps. Each cutter link includes a generally L-shaped cutter tooth or blade with top and side cutting edges and a depth gauge ahead of the cutter tooth to limit the depth of penetration of the top cutting edge into the wood. There is a predetermined desired vertical distance or "clearance" between the top cutting edge and the top of the depth gauge. With repeated sharpenings of the cutting edges, the cutter tooth becomes shorter. However, because the cutter tooth has a clearance angle, or backslope, along its top surface, the top cutting edge becomes lower on the link as the tooth becomes shorter, thereby reducing depth gauge clearance. Thus, as the tooth becomes shorter, the height of the depth gauge should be reduced so as to maintain a desired clearance.

In the past, depth gauge clearance has been maintained most often by hand filing. File guides have long been available for this purpose. Typically, the file guide is supported on top of the cutter tooth and extends forwardly therefrom over the depth gauge with a slot in the guide through which an upper portion of the depth gauge protrudes if the depth gauge is too high for a given height of cutter tooth. The user then simply wipes a flat file across the file guide to remove the protruding metal from the top of the depth gauge until the depth gauge is flush with the guide surface. Typical such file guides are shown, for example, in U.S. Pat. Nos. 2,622,338; 2,705,376, and 3,365,805.

Others have devised power grinders for grinding depth gauges to a desired height relative to its cutter tooth. Silvey U.S. Pat. No. 3,717,051 discloses a depth gauge grinder which has been made available commercially in both manual and automatic versions. In such grinder, the grinding wheel is preset to grind a desired clearance by measuring from the top of a selected cutter tooth. Then all depth gauges on the saw chain are ground with the grinding wheel at the same preset position. If the cutter teeth of all cutter links of the saw chain are of about the same length so that the top cutting edges of the cutter teeth are all at about the same height, such grinder will grind all depth gauges to about the same clearance. However, many persons who use and sharpen saw chains do not always maintain all cutter teeth of their saw chains at about the same length, although this is highly recommended. Where different cutter teeth of a saw chain are of widely differing lengths, the Silvey grinder will produce different depth gauge clearances on different cutter links depending on the length of the tooth.

Other depth gauge grinders have been devised which determine depth gauge clearance by measuring or indexing from the top of each cutter tooth. For example, Granberg U.S. Pat. Nos. 3,796,113 and 4,002,089 disclose a power-operated depth gauge grinder for use in grinding depth gauges while the saw chain remains on the bar of the chain saw. A guide plate attached to the grinder is supported on the top of the cutter tooth of the cutter link while the grinding element lowers the depth gauge of the same link as determined by the vertical distance between the bottom surface of the guideplate, and the grinding surface of the element.

Ziegelmeyer U.S. Pat. No. 4,267,751 discloses a power-operated depth gauge grinder which operates on a principle similar to that of the aforementioned Granberg patents but with the saw chain removed from the chain saw bar and mounted on the saw chain support of a grinding machine. As each cutter link is advanced toward the grinding wheel, the top of the cutter tooth of such link engages a preset guide plate which depresses the saw chain support so that a depth gauge is brought into contact with the grinding wheel at an elevation that will grind the depth gauge to the desired preset clearance. Thus, the Ziegelmeyer device, like those of Granberg and prior file guides, determines depth gauge clearance for each cutter link by indexing from the cutter tooth of the same link.

The advantages of the hand file guides and prior Granberg and Ziegelmeyer depth gauge grinders over, for example, the aforementioned Silvey depth gauge grinder, is that the former will produce a fairly uniform depth gauge clearance on all cutter links of a chain regardless of wide variations in the lengths of the cutter teeth of that chain. However, they have no advantage over the Silvey depth gauge grinder in instances where all cutter teeth of a saw chain are maintained at approximately the same length, as recommended.

All of the aforementioned types of power-operated depth gauge grinders and all other known depth gauge grinders have two principal drawbacks.

First, depth gauge grinders of the Granberg and Ziegelmeyer types have guide plates or indexing means which rub across the top cutting edge of the cutter tooth during the grinding operation and therefore have a tendency to dull the previously sharpened cutter tooth. In this regard, it is universal practice to sharpen the cutter teeth before lowering the depth gauges so that the depth gauge clearance is determined relative to the sharpened cutter tooth with which it works.

Second, none of the aforementioned depth gauge grinders provide for any automatic compensation to *increase* depth gauge clearance as the cutter tooth becomes shorter. Experts in sharpening saw chain agree that as a cutter tooth becomes shorter with repeated sharpenings, depth gauge clearance should be increased to compensate for the increasing longitudinal distance between the depth gauge and the cutting edge. As a saw chain travels at high speed about a saw bar, there is a tendency for the forward end of each cutter link to ride higher than the rear end. This is caused by two factors. One is the tendency of the rear end of the lower edge of a cutter link to wear faster than the forward end. The other is the tendency of the forward end to be lifted as it is pulled about the saw bar. The combination of this lifting effect on the forward portion of the cutter link and the greater wear on the rear lower edge in effect raises the depth gauge relative to the cutting edge of a link, producing an effective reduced clearance which becomes more noticeable as the distance between the depth gauge and the cutting edge increases. To compensate for this, some experts advise that the measured depth gauge clearance on a cutter link with a worn cutter tooth should be up to ten thousandths of an inch greater than on a link with a new cutter tooth. None of the aforementioned depth gauge grinders automatically compensate for this need for increased clearance as the cutter tooth wears back.

Third, none of the aforementioned depth gauge grinders are capable, without adjustment, of providing the right-hand cutter links with a different depth gauge clearance than the left-hand cutter links of the same chain when desired. In practice, it has been found that with chain saws on which the motors are offset on the left-hand side of the saw bar, as is commonly the case, the saw chain tends to run to the right when cutting wood. It is believed that the reverse effect would be true if the motor is offset to the right-hand side of the saw. To compensate for the tendency of a saw chain to "run to the right", which means the left-hand cutters are outcutting the right-hand cutters of the saw chain, the clearance of the depth gauges of the left-hand cutters should be reduced or the clearance of the right-hand cutters increased. None of the mentioned power depth gauge grinders are capable of accomplishing this without an adjustment of the grinding machine itself.

Accordingly, there is a need for a power-operated depth gauge grinder which overcomes the aforementioned drawbacks of prior power grinders while maintaining their advantages of fast and accurate depth gauge grinding.

A primary objective of the invention, therefore, is to provide a depth gauge grinding machine which automatically increases the depth gauge clearance of a cutter link as the cutter tooth of that link becomes shorter through repeated sharpenings.

Another primary object of the invention is to provide a depth gauge grinder as aforesaid which is capable, without adjustment, of grinding the depth gauges of the right-hand cutter links to a different clearance than the depth gauges of the left-hand cutter links.

Still another primary object of the invention is to provide a depth gauge grinder as aforesaid which determines depth gauge clearance by gauging from the top cutting edge of its associated cutter tooth, but without any direct rubbing contact between the gauging or indexing means and the cutting edge so that the cutting edge will remain sharp during the depth gauge grinding operation.

Other objectives of the invention are to provide a depth gauge grinder as aforesaid which is simple to operate, has a minimum of adjustments, is economical to operate and maintain, and is adaptable to automatic operation.

Still another objective is to provide a depth gauge grinder as aforesaid which does not require the indexing means to remain in contact with the top of the cutter tooth while the depth gauge is ground.

The foregoing and other objects, features, and advantages of the present invention will become apparent from the following detailed description which proceeds with reference to the accompanying drawings.

SUMMARY OF THE INVENTION

The foregoing objectives are carried out in accordance with the invention by providing a saw chain depth gauge grinder in which the saw chain is mounted on a carrier means with the cutter link containing the depth gauge to be ground in a predetermined position for grinding, and with the carrier means and grinding means being relatively movable along a predetermined path to move the depth gauge toward and away from the grinding means. During such relative movement, an indexing means positioned along the path and cooperable with the cutter tooth associated with the depth gauge to be ground, induces generally vertical relative movement between the grinding means and the carrier means to determine the desired grinding position of the grinding surface of the grinding means relative to the depth gauge. During relative movement along such path, a shield means is engaged by the indexing means and forced into contact with the top of the cutter tooth to prevent direct rubbing contact between the indexing means and the cutter tooth. Thus, indexing actually occurs through direct contact between the shield means and the indexing means rather than through direct contact between the indexing means and the top of the cutter tooth.

The grinder may include clearance adjustment means cooperable with the indexing means and the top of the cutter tooth operable automatically to increase depth gauge clearance as the cutter tooth becomes shorter. Such clearance adjustment means may include means causing the top of the cutter tooth to contact an indexing surface at a compensating angle that is greater than the back slope angle of the top of the cutter tooth. The clearance adjustment means may include means on the carrier means for disposing the selected cutter link at an angle relative to the indexing surface thereby to define at least a portion of the compensating angle. The indexing surface may also be inclined upwardly in a direction rearwardly from the top cutting edge of the cutter tooth relative to the bottom edge of the cutter link to at least partially define the compensating angle.

The grinder of the invention may also include clearance compensating means cooperable with the indexing means and the tops of the alternating right and left-hand cutter teeth for automatically grinding the depth gauges of the right-hand cutter links to a different clearance than the depth gauges of the left-hand cutter links. Such clearance compensating means may include a laterally-sloping indexing surface contactable by the tops of the cutter teeth during relative movement of the carrier means and grinding means along their path of relative movement and cooperable with the indexing means. Such surface slopes laterally of the saw chain on the carrier means so that the surface contacts the tops of the right-hand cutter teeth at a different level than that at which it contacts the left-hand cutter teeth.

The invention may also include means for disengaging the indexing means from the shield means and the shield means from the top of the cutter tooth before grinding each depth gauge so as to minimize contact between the cutter tooth and grinding machine elements and thus minimize the possibility of dulling the cutting edge of the cutter tooth.

DETAILED DESCRIPTION OF A PREFERRED EMBODIMENT

Figure 1:
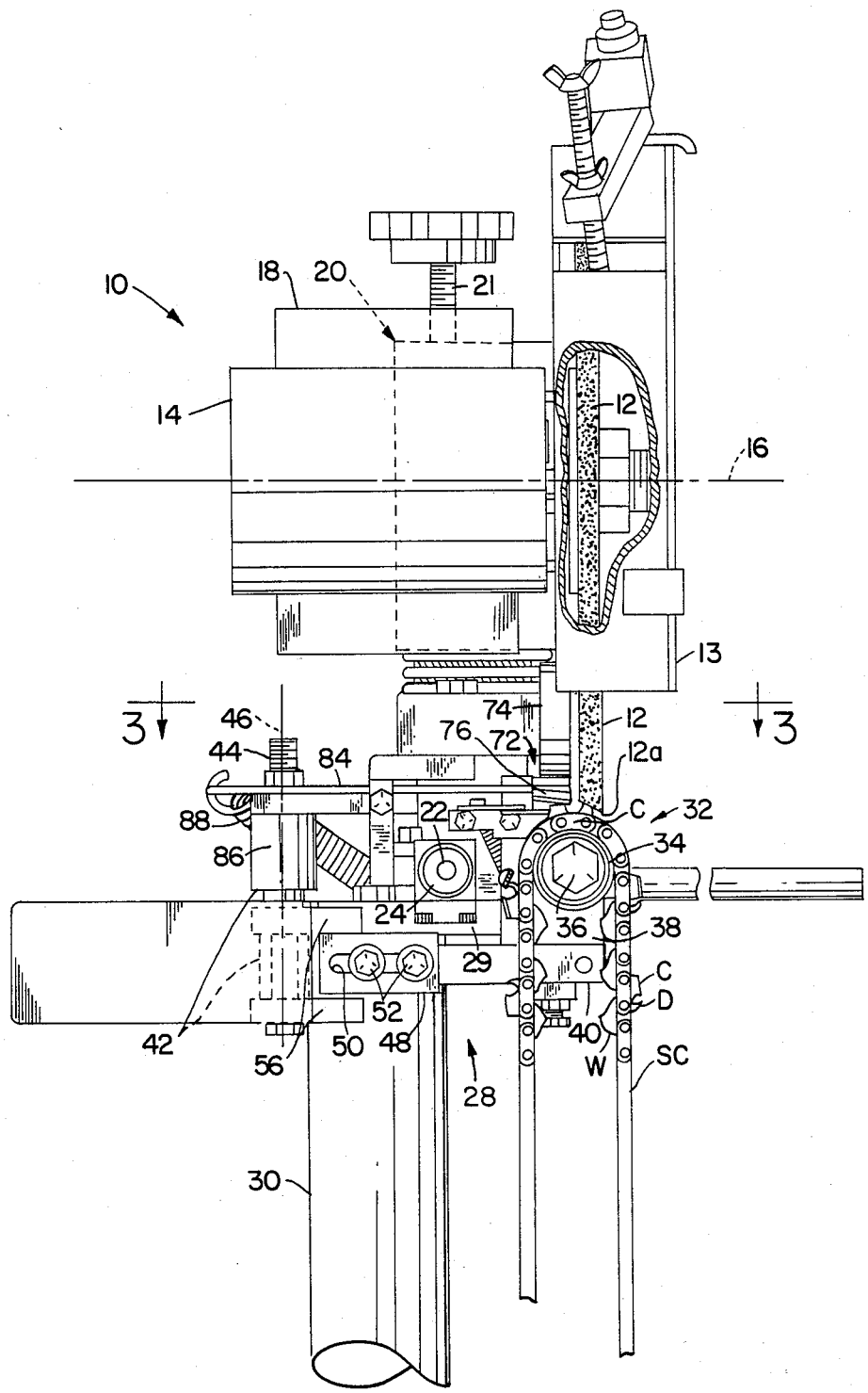
FIG. 1 is a side elevational view of a depth gauge grinding machine in accordance with the invention mounted on a stand, the lower portion of which is omitted.

Referring first to FIGS. 1-6 of the drawings, a saw chain depth gauge grinder 10 in accordance with the invention includes a grinding means in the form of a grinding wheel 12 shielded by a wheel guard 13 and driven by an electric motor 14. The motor is mounted for rotating the wheel about a generally horizontal axis 16. Motor 14 includes a motor housing 18 secured at one side to a vertically extending slide means 20. Slide means 20 pivotally mounts the grinding wheel assembly described to a pivot shaft 22 rotatably mounted in bearings 24 carried by bearing blocks 26 secured to a stationary frame 28, for limited pivoting movement about a generally horizontal axis 23. Axis 23 lies in a vertical plane which is perpendicular to the vertical plane of grinding wheel axis 16. Frame 28 includes a horizontal platform portion 29 secured to a stationary support column 30 supported on a base (not shown) at ground level in a well known manner.

Slide means 20 operates to move the grinding wheel assembly vertically and thus adjust the level of the grinding surface 12a of the grinding wheel relative to the stationary frame 28. Slide 20 is of known construction as disclosed in Silvey U.S. Pat. No. 3,779,103. Briefly, it includes a slide bar 20a secured to pivot shaft 22 and slidably received within a slide casing 20b. An adjusting screw 21 threaded through the top of casing 20b engages the top of slide bar 20a. Because casing 20b is secured to motor housing 18, turning of screw 21 clockwise elevates the grinding wheel assembly. A tension spring 25 lowers the assembly when screw 21 is turned counterclockwise.

Also supported on the frame is a saw chain carrier means shown generally at 32. The carrier means is adapted to support a continuous loop of saw chain SC with a cutter link C of the chain positioned for grinding the depth gauge D of such link and such that the cutter tooth T of the same link interacts with indexing means to determine depth gauge clearance.

Figure 2:
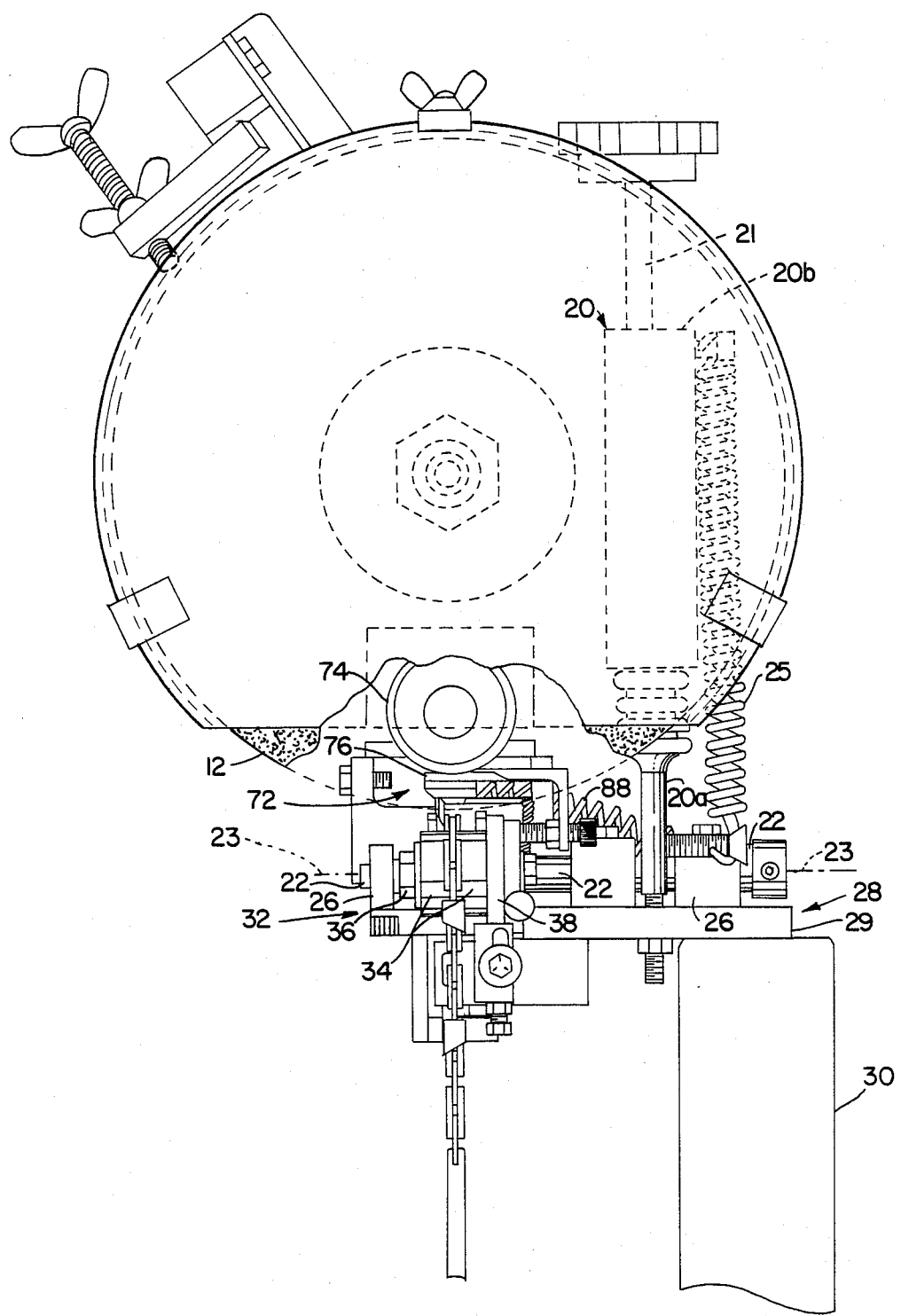
FIG. 2 is a front elevational view of the depth gauge grinding machine of FIG. 1.

The carrier means includes an upper pair of saw chain support rollers 34 and a similar lower pair of support rollers (not shown) supported from a lower portion of support column 30 in a well known manner such as shown, for example, in prior Silvey U.S. Pat. No. 3,717,051. Saw chain support rollers 34, as shown best in FIG. 2, are actually ball bearings which are mounted side-by-side in slightly spaced apart relationship so as to receive snugly in the gap therebetween the center drive links of a saw chain. The side links, including cutter links and tie straps of the saw chain, ride on the rotatable peripheral surfaces of the rollers.

Figure 4:
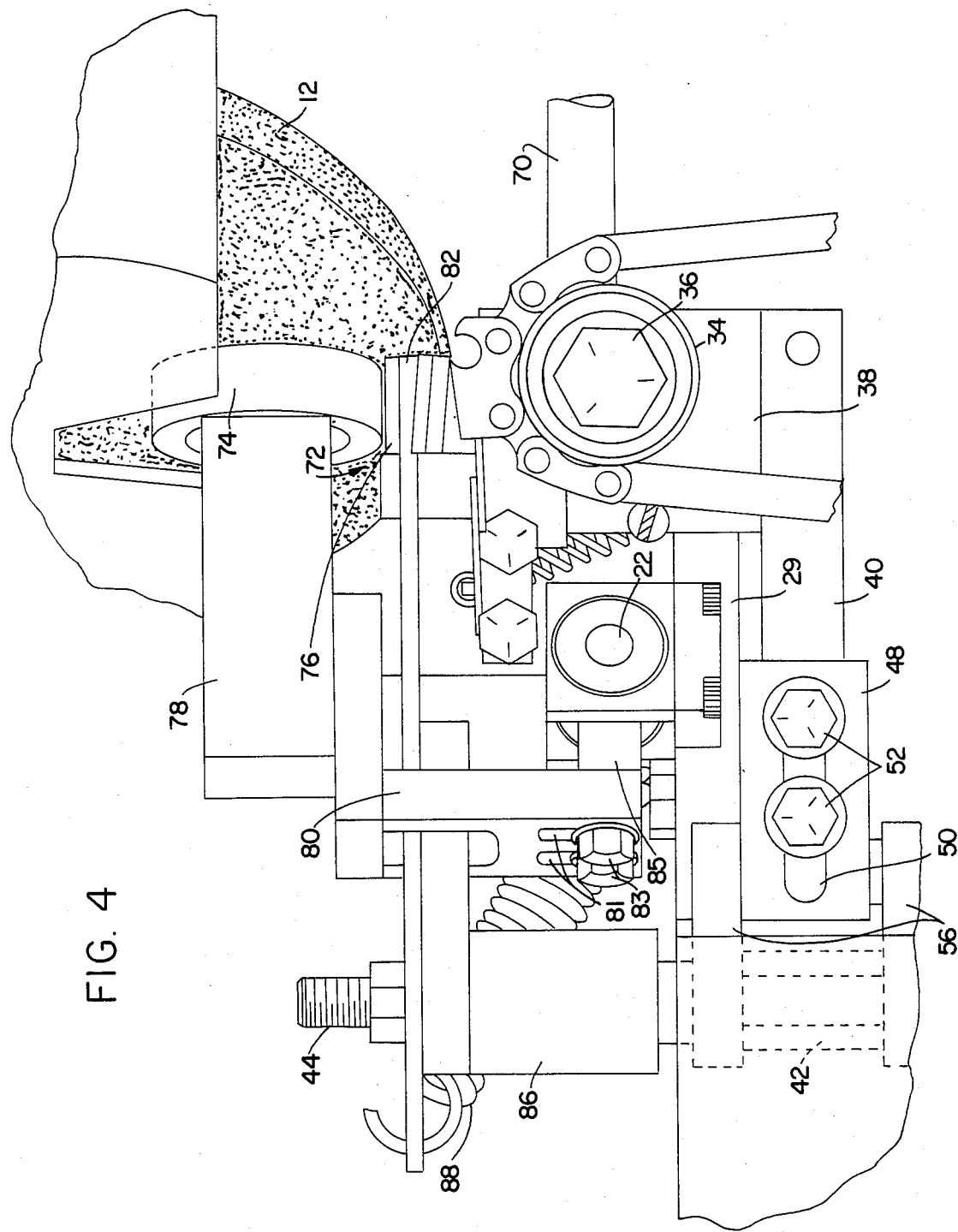
FIG. 4 is an enlarged partial side elevational view of a portion of the machine of FIG. 1 in grinding position.

As shown best in FIG. 4, the stationary inner portions of rollers 34 are secured by a screw 36 to a carrier plate 38 extending upwardly from a carrier arm 40. Carrier arm 40 extends generally horizontally to a pivot connection 42 with an upright pivot shaft 44 for pivoting movement of the chain support rollers 34 about a generally upright pivot axis 46. Carrier arm 40 includes an enlarged arm portion 48 which slidingly receives main arm 40. Arm portion 48 is slotted at 50. A pair of bolts 52 extending through arm 40 at the slots 50 lock arm 40 in various adjusted portions along the slots to provide for a length adjustment of the carrier arm. Enlarged slide portion 48 is in turn secured to the upper and lower clevis members 56 which are attached to the upper and lower ends of journal bearing 42 to rotatably support the carrier arm on upright pivot shaft 44. Pivot shaft 44 is secured to the stationary frame 28.

Although not clearly shown, upright carrier plate 38 is vertically adjustable on carrier arm 40 in a manner similar to the longitudinal adjustment of carrier arm 40. The objective, of course, is to be able to properly position a cutter link C in alignment both horizontally and vertically with the lower grinding surface 12a of grinding wheel 12. This alignment will vary, of course, with saw chains of different sizes and pitches, necessitating such adjustments.

Figure 5:
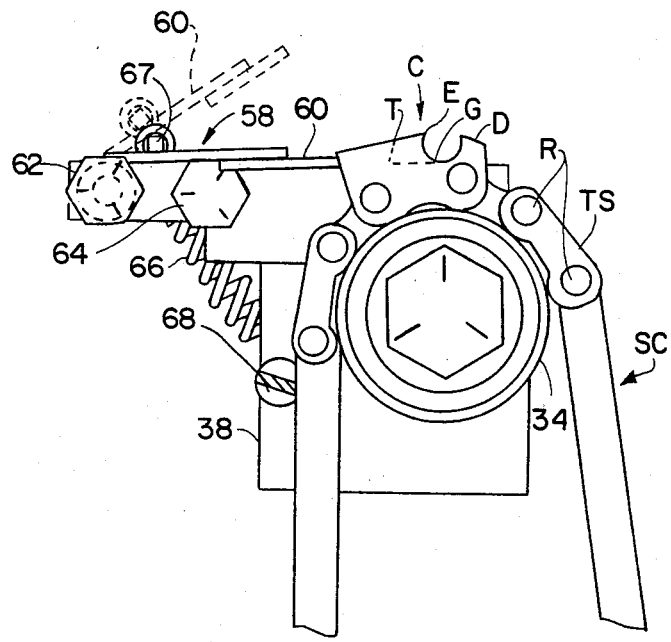
FIG. 5 is a partial elevational view of the saw chain carrier portion of the machine of FIG. 1 on an enlarged scale with the carrier portion in a retracted position away from the grinding wheel.
Figure 6:
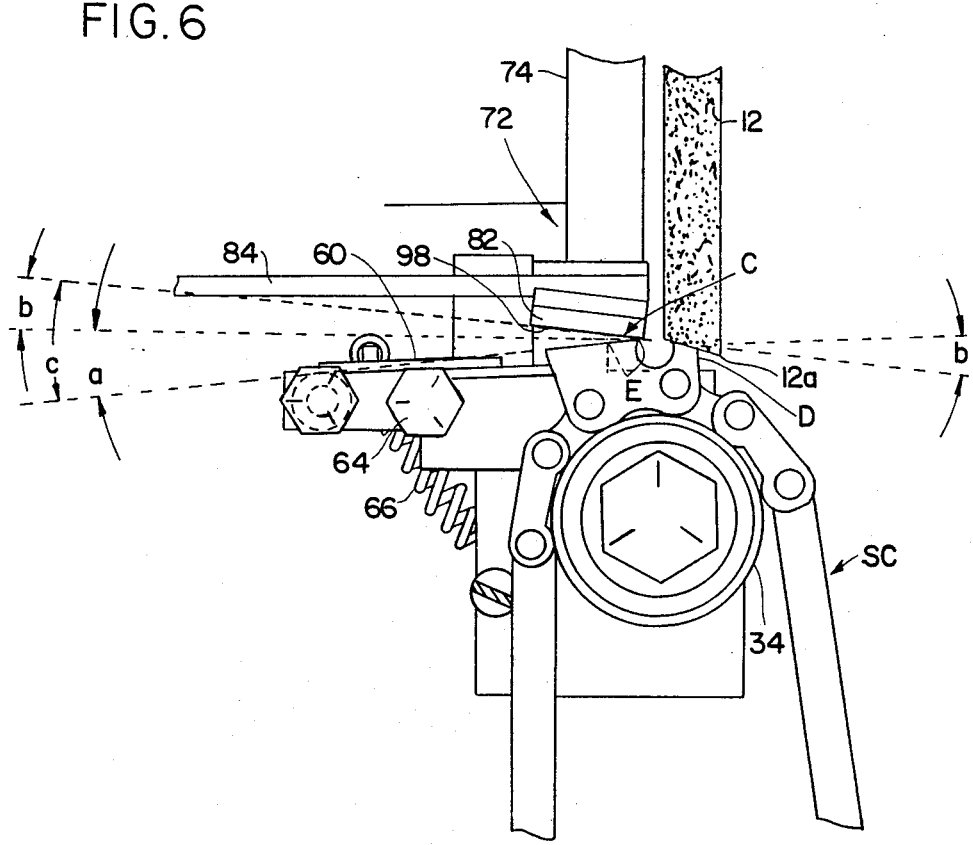
FIG. 6 is a view similar to FIG. 4 but with the saw chain carrier shown in its grinding position.
Figure 8:
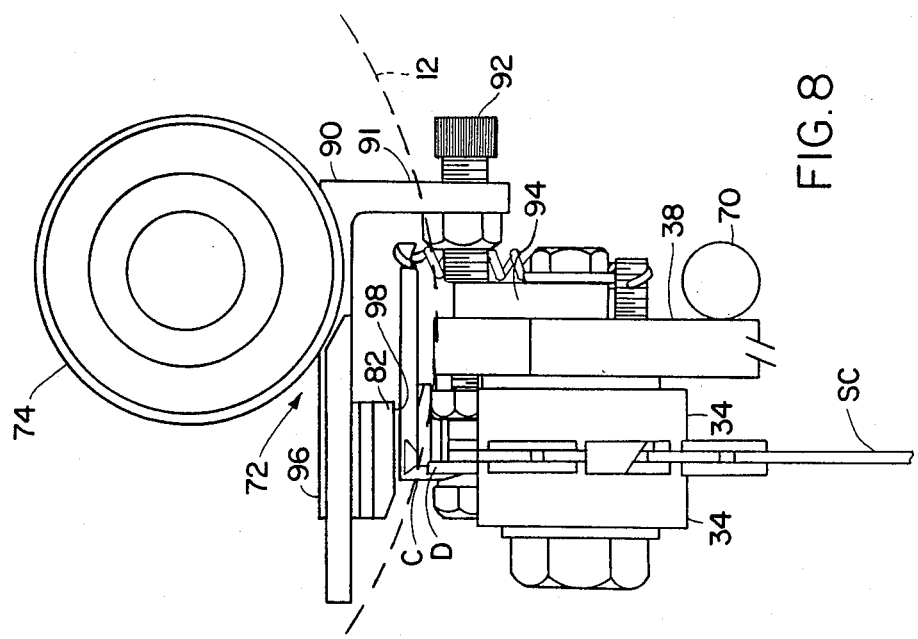
FIG. 8 is a view similar to FIG. 7 but showing the saw chain carrier approaching its grinding position.

As shown best in FIGS. 4-6, the saw chain carrier means also includes a saw chain stop means 58 for properly positioning a saw chain cutter link C on the support rollers 34 so that when the carrier arm is pivoted toward the grinding wheel, depth gauge D will come into grinding engagement with the lowermost grinding surface 12a of the wheel. Stop means 58 includes a stop member 60 for engaging the rear edge of a cutter link C. Stop member 60 is mounted at its rear end for pivoting movement at 62 between a raised position shown in broken lines and a lower operative position shown in full lines in FIG. 5. The lowermost position of stop member 60 is determined by an abutment member 64. A tension spring 66 connected at one end 67 to an intermediate portion of stop member 60 and at its other end to carrier plate 38 biases stop member 60 in its lower operative position.

Stop member 60 is forced to a raised position when another cutter link (not shown) is advanced into grinding position on support rolls 34 after depth gauge D of the cutter link C in FIG. 5 has been ground to its proper clearance. As the next cutter link C is advanced to its grinding position in FIG. 5, it will force stop member 60 upwardly until the advancing cutter link clears the stop member, after which the stop member drops back to its lower limit position. Thereafter, the advanced cutter link is backed against the free end of the stop member 60 to determine its grinding position.

The carrier means also includes a handle 70 operatively attached to the carrier arm for swinging the arm about its pivot axis 46. The handle is thus used to swing the saw chain support and its supported saw chain with a cutter link in grinding position toward and away from grinding wheel 12. In this way, the depth gauge D is moved into grinding engagement with the lower grinding surface 12a of the wheel.

Although a manually operated depth gauge grinder is shown, it should be understood that the grinder as described can also be automated if desired. When automated, the grinder would automatically advance a cutter link C to its grinding position on support rollers 34, then automatically swing the carrier arm toward and away from grinding wheel 12 to grind a depth gauge to its proper clearance, and then advance the next cutter link into grinding position. A hydraulic automatic grinder operating mechanism of the type shown, for example, in my prior copending application Ser. No. 249,744, filed Mar. 31, 1981, now U.S. Pat. No. 4,416,169, can be adapted for this purpose.

INDEXING MEANS

Regardless of whether the grinding machine is operated manually or automatically as described, it is provided with indexing means shown generally at 72 in FIGS. 1–4 and in greater detail in FIGS. 6–10. The indexing means operates to position the grinding surface 12a at a proper level, referenced to the top cutting edge of each cutter tooth T, to grind a desired clearance on the depth gauge D for that tooth. Operation of the indexing means is initiated by movement of the carrier toward the grinding wheel with a cutter link C in grinding position on the carrier.

Before describing the indexing means further, it may be helpful first to describe the anatomy of a saw chain and particularly its cutter links. Referring to FIGS. 5 and 6, a saw chain SC is mounted on a chain saw (not shown) as an endless loop and is driven on such saw by a drive sprocket connected directly or indirectly to the drive shaft of a motor. The chain itself travels about the peripheral edge, or rail, of a saw bar. The rail has a longitudinal slot to receive the tang of a center drive link of the chain. Such center drive link and particularly its tang W is shown in FIG. 1. In addition to each center drive link, the chain is made up of a series of left and right-hand side links which slide along the edge surface of the saw bar as the drive link travels in its slot. The side links are pivotally interconnected with the center drive links by rivets R. Some of the side links are cutter links C while others of the side links are so-called tie straps TS. Typically, all right-hand cutter links of a saw chain are of identical configuration as are all left-hand cutter links, and the left and right-hand cutter links are mirror images of one another.

Each cutter link, still referring to FIG. 5, includes a depth gauge D at its forward end as determined by the direction of travel of the chain on the saw bar, and a cutter tooth T rearward of the depth gauge and separated therefrom by a gullet G. Cutter tooth T, as viewed from the front, is generally L-shaped (see FIG. 12) with a top cutting edge E extending laterally of the chain and intersecting a side cutting edge at a cutting corner. The function of the depth gauge D is to determine the depth of cut of the top cutting edge E as the cutter link travels through the wood along the bottom of the kerf formed by the cutting action of the chain. For the cutter tooth to have any cutting action, the top of its depth gauge D must be lower than its cutting edge E. The vertical distance between the top cutting edge E and the top of depth gauge D is referred to herein as depth gauge clearance. This clearance for a new cutter link is typically 25 to 30/1,000 of an inch. For a worn cutter link whose tooth is much shorter because of repeated sharpenings, this clearance should be increased to up to 40/1,000 of an inch, for a reason to be explained hereinafter.

It will be noted from FIGS. 5 and 6 that the top surface of the cutter tooth T slopes downwardly and rearwardly from its top cutting edge E at an angle a to the horizontal, or more accurately to the plane defined by the bottom edge of the cutter tooth C. This angle a, referred to herein as the back slope or clearance angle, shown in FIG. 6, provides a clearance rearwardly of the cutting edge E as it moves through the wood, thereby enabling it to cut. Because of back slope angle a, not only will the cutter tooth T become shorter through repeated sharpenings, but the cutting edge E will also become lower on the cutter link. Thus, as the cutter tooth becomes shorter, the depth gauge D must be lowered to at least maintain a desired clearance. Hence, the need for a depth gauge grinding machine.

Most saw chain sharpening experts agree that the actual measured depth gauge clearance should be increased as the cutter tooth becomes shorter because of the tendency of the forward portion of the tooth, including the depth gauge, to ride higher than the rear portion of the tooth as it is pulled about the saw bar and through the wood by the chain saw. This is caused by two factors, one being the tendency of the forward rivet connecting the cutter link to the drive link to lift the forward end of the cutter link as it is pulled. The second is the tendency of the rear portion of the bottom edge of the cutter link to wear faster than the front portion because of the pressure put on the rear portion by the cutting edge while cutting.

The higher riding forward end of the cutter link has no appreciable effect on depth gauge clearance when the cutter link is new because the depth gauge D and the top cutting edge E are fairly close together and any such tendency affects both elements to about the same extent. However, as the top cutting edge recedes rearwardly on the cutter link through repeated sharpenings, the top cutting edge approaches the rear portion of the chain and its distance from the depth gauge increases. As a result, such cutting edge becomes increasingly affected by any tendency of the forward depth gauge portion of the link to ride higher than the rear portion of the same link. In effect, therefore, the actual depth gauge clearance as the chain cuts is substantially less than measured clearance in well-used saw chains having short teeth. Accordingly, measured depth gauge clearance should be increased as the cutter tooth becomes shorter to compensate for the effective reduction in clearance during operation as the cutter link wears and its tooth becomes shorter.

Now, returning to a more detailed description of the indexing means, such term as used herein refers to the means or elements of the saw chain grinder which operate to measure or gauge the desired clearance between the top of the depth gauge D and the top cutting edge E of the same cutter link and set the grinding surface 12a at a level relative to the top of the depth gauge D that will produce the measured clearance. In the illustrated grinder, indexing means 72 includes the top cutting edge E of a cutter link positioned for grinding on the chain support roll 34, and indexing roller means 74 positioned along the path of travel of the support rolls 34 toward and away from the grinding wheel. The indexing means also includes shield means 76 also positioned along such path of travel and adapted to move with the carrier means toward the grinding wheel for interaction with the indexing roller 74.

Referring to FIG. 4, indexing roller 74 is a ball bearing having its stationary center portion attached to a mounting block 78 which in turn is secured to an inverted L shaped support bracket 80. The lower end of support bracket 80 includes a forward extension 85 secured to the same pivot shaft 22 that mounts the grinding wheel assembly. Thus, any pivoting movement of shaft 22 induced by indexing roller 74 will cause a corresponding pivoting movement of grinding wheel 12 about horizontal pivot axis 23.

Still referring to FIG. 4, shield means 76 includes a shield plate 82 mounted at the forward end of a vertically resilient shield mounting arm 84. Arm 84 is secured at its inner end to a journal bearing 86 journaled on the same upright shaft 44 to which the carrier arm is journaled, for pivoting movement about the same upright axis 46 as the carrier arm.

Figure 3:
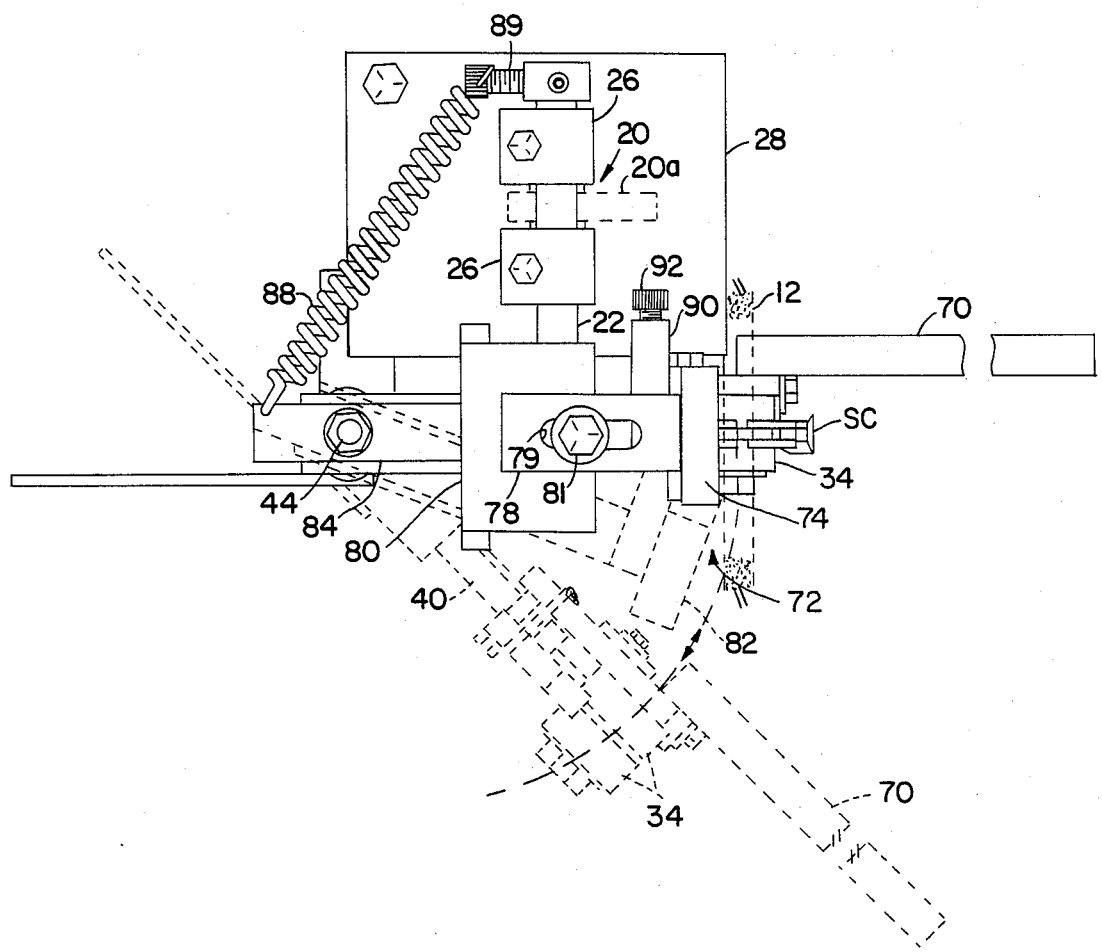
FIG. 3 is a view taken approximately along the line 3—3 of FIG. 1 showing a lower portion of the machine in plan as viewed from above.

As shown in FIG. 3, there is a slot 79 through which a bolt 81 extends to connect block 78 to support bracket 80. The slot thus provides for longitudinal adjustment of the effective length of the block to adjust the position of indexing roller 74 along and relative to the path of travel of support roll 34. As will be apparent from FIGS. 4 and 6, indexing roller 74 must be adjusted to contact the top of shield plate 82 when the depth gauge D of a cutter link is aligned beneath grinding wheel 12. At such time, shield plate 82 overlies the top cutting edge E of cutter link C and therefore indexing roller 74 should also overlie such cutting edge.

Indexing roller 74 also includes a height adjustment, best shown in FIG. 4. The height adjustment comprises a pair of slots 81 in the upright portion of support bracket 80 and screws 83 extending through such slots to join the upright portion of support bracket 80 to forward extension 85. By adjusting the positions of screws 83 in slots 81, the height of indexing roller 74 will be adjusted relative to the height of shield plate 82, the importance of which will soon be apparent.

As previously noted, shield mounting arm 84 is capable of pivoting about the same upright axis 44 as carrier arm 40. As shown best in FIG. 3 but also in FIG. 1, a tension spring 88 connected to the rear end of shield arm 84 and anchored by a screw 89 to the end cap of horizontal pivot shaft 22 biases arm 84 and thus shield plate 82 to a retracted position away from the grinding wheel 12 and out from under indexing roller 74. This normal retracted position of the shield plate is illustrated in FIG. 7.

Figure 7:
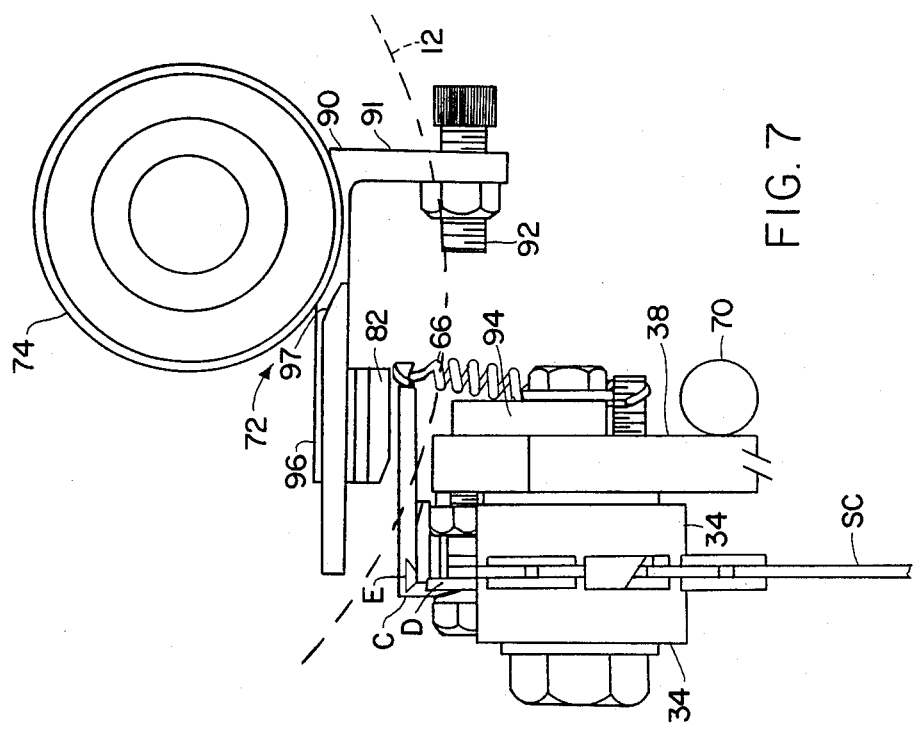
FIG. 7 is a front elevational view of a portion of the grinder elements shown in FIG. 2 on an enlarged scale and showing the saw chain carrier in its most retracted position.
Figure 10:
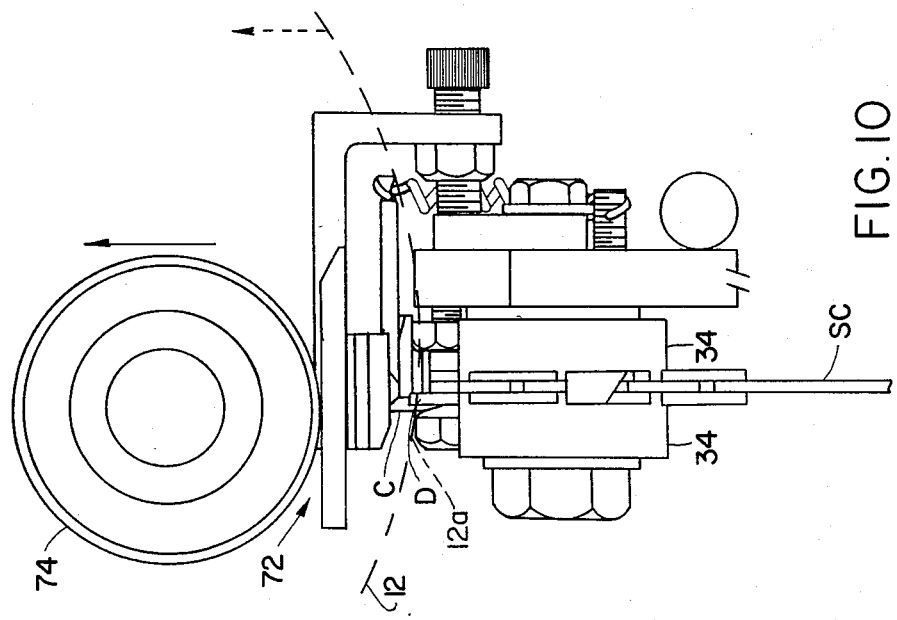
FIG. 10 is a view similar to FIGS. 7-9 but showing the carrier in its grinding position.

Referring to FIGS. 3 and 7, shield mounting arm 84 carries a laterally cantilevered pickup arm 90 which extends toward the grinding wheel and includes a downturned portion 91 mounting an abutment screw 92 which extends toward carrier arm 40. Thus, as the carrier arm swings toward the grinding wheel, shown sequentially in FIGS. 7 and 8, an abutment surface 94 on carrier support plate 38 engages screw 92, whereby continued movement of the carrier arm toward the grinding wheel carries the shield means with it, moving shield plate 82 beneath indexing roller 74. Shield plate 82 includes a laterally elongated plate portion 96 having a ramp 97 at its end nearest indexing roller 74.

Figure 9:
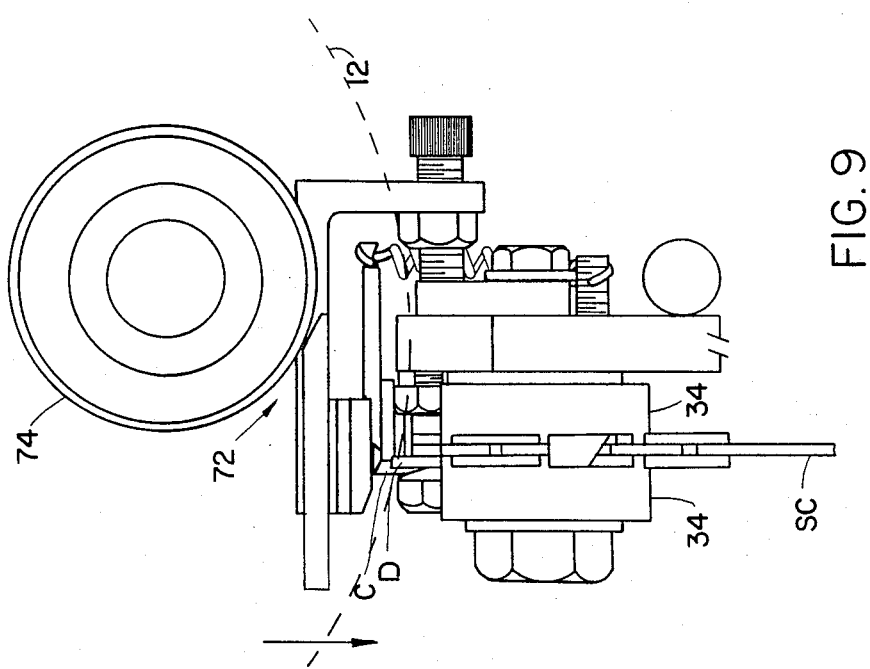
FIG. 9 is a view similar to FIGS. 7 and 8 but showing the saw chain carrier just before reaching its grinding position and at the start of the indexing operation.

As the carrier arm swings further toward the grinding wheel, picking up the shield arm with it to move it toward the wheel also, ramp 97 of shield plate portion 96 engages indexing roller 74 as shown in FIG. 9. The roller forces shield plate 82 downwardly until its bottom surface 98 engages the top of cutter tooth T because of the resilience of the shield mounting arm 84. However, as will be evident from comparing FIGS. 9 and 10, the total thickness of shield plate 82 is greater than the distance from the lowermost surface of indexing roller 74 to the top cutting edge E of cutter link C. Therefore, continued movement of carrier arm 40 toward the grinding wheel to the position shown in FIG. 10 after the shield plate has contacted the top of cutter tooth C, causes ramp 97 to force indexing roller 74 upwardly about its horizontal pivot axis 23. Because pivot shaft 22 mounts both indexing roller 74 and the grinding wheel assembly, upward movement of indexing roller 74 causes a corresponding upward movement of grinding wheel 12. The vertical position of indexing roller 74 is adjusted so that the distance travelled by roller 74 during its upward movement positions grinding surface 12a at a level below the top of cutting edge E corresponding to the desired depth gauge clearance. As a result, depth gauge D will be ground to produce that clearance.

From the foregoing description of the functioning of the indexing means, it will be apparent that shield plate 82 protects the top cutting edge E of the cutter link C from direct engagement with the indexing roller 74. The absence of any rubbing or rolling contact between the shield plate and cutting edge prevents dulling of such edge. In FIGS. 7–10, the grinding wheel is represented by imaginary line 12 with the grinding surface 12a being at the lowest point of such line.

After the depth gauge is lowered by the grinding wheel, the carrier arm is retracted. When this occurs, shield arm return spring 88 returns the shield plate with the carrier until the plate reaches its fully retracted position shown in FIG. 7. It will be apparent from the foregoing that the weight of indexing roller 74 and the grinding wheel assembly is greater than the resistance of the shield mounting arm to downward bending movement when the shield plate contacts the indexing roller. This ensures that the shield plate is pushed against the top of the cutter tooth before any upward indexing movement of the indexing roller 74 occurs.

AUTOMATIC-CLEARANCE COMPENSATION FEATURE FOR CUTTER TOOTH WEAR

FIG. 6 illustrates an important feature of the invention which provides for an automatic increase in depth gauge clearance as the cutter tooth T becomes shorter. The desirability of this feature has been previously noted. It will be evident from FIG. 6 that the bottom surface 98 of shield plate 82 is inclined in a direction rearwardly from the cutting edge E of cutter tooth T at an angle b measured from the horizontal in FIG. 6. This shield plate angle b plus the back slope angle a of the top of the cutter tooth produces a compensation angle c which is greater than the back slope angle a. Therefore, as cutter tooth T becomes shorter and cutting edge E lower with repeated sharpenings, illustrated by the broken line E', bottom surface 98 of the shield plate must move downward a greater distance before contacting the cutting edge than it normally would if such surface were horizontal. This means that after such contact, indexing roller 74 and grinding wheel 12 will move upward a lesser distance than they normally would if bottom surface 98 were horizontal. As a result, grinding surface 12a is positioned lower relative to cutting edge E' than it is positioned relative to a newer cutting edge E, producing a greater clearance with respect to edge E'. Thus, the sloping surface 98 produces a progressively increasing clearance as the tooth T becomes shorter. It will also be apparent that if the bottom surface 98 were maintained horizontal, or parallel to the bottom edge of cutter link C, depth gauge clearance would not increase as tooth T becomes shorter but instead would be maintained constant.

Figure 11:
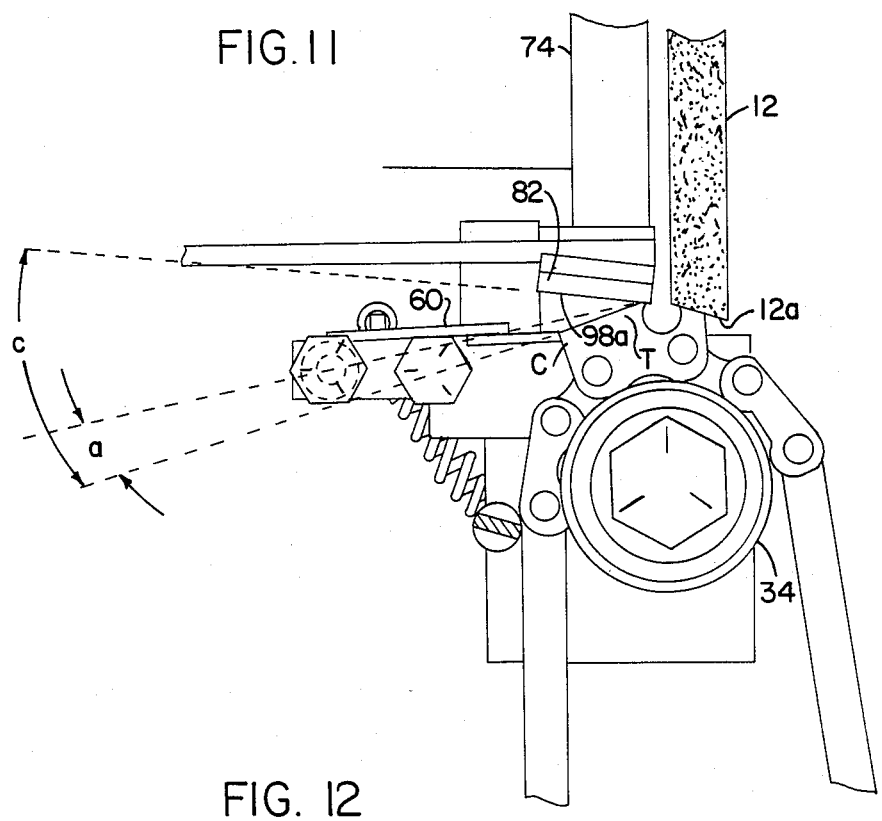
FIG. 11 is a view similar to FIG. 6 but showing a modified means for automatically increasing depth gauge clearance as the length of the cutter tooth decreases.

FIG. 11 illustrates an alternative means for achieving the same result achieved by inclined bottom surface 98 of shield plate 82; that is, another means for automatically increasing depth gauge clearance as the tooth T of cutter link C becomes shorter. In FIG. 11, bottom surface 98a of the shield plate 82 is maintained in a horizontal position, but tooth stop 60 is adjusted so that cutter link C is in its grinding position when on an "uphill" surface of chain support rollers 34 rather than when disposed horizontally at the top of such roller. In its position shown in FIG. 11, cutter tooth C is angularly disposed with respect to shield plate bottom surface 98a at a compensating angle c which is greater than back slope angle a, thereby achieving the same result as described with respect to FIG. 6.

It will also be apparent from the foregoing that the automatic increase in depth gauge clearance can be achieved through a combination of a small upslope on bottom surface 98 of the shield plate and a slight angular disposition of the cutter tooth C with respect to such bottom surface. In any case, compensating angle c can be achieved either through positioning of cutter tooth C on its support rollers 34, or by inclining the bottom surface 98 of the shield plate 82, or by a combination of both. Compensating angle c in most cases should be about 4 degrees greater than clearance angle a to vary depth gauge clearance about 0.010 of an inch between a long new tooth and a short old tooth.

AUTOMATIC CLEARANCE COMPENSATION BETWEEN LEFT AND RIGHT CUTTERS

Figure 12:
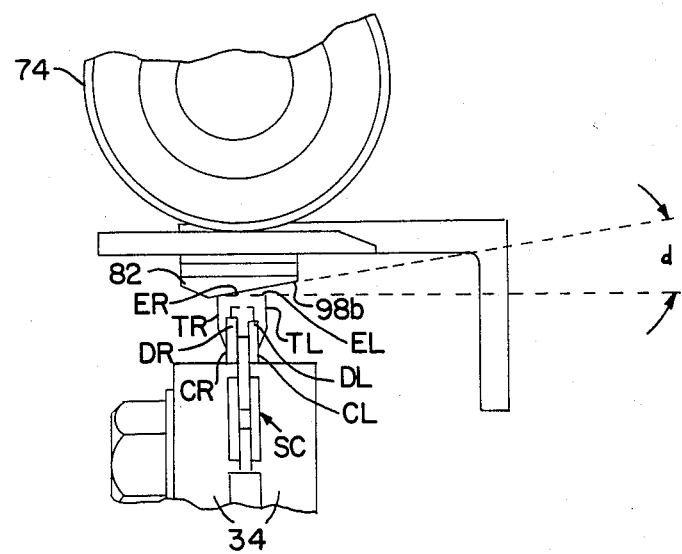
FIG. 12 is a view similar to FIG. 9 but of a modified form of the grinder including means for automatically grinding the depth gauges of the left-hand cutter links to a different clearance than the depth gauges of the right-hand cutter links.

FIG. 12 illustrates another feature of the invention which provides for an automatic differential in depth gauge clearance between the right-hand and left-hand cutter links. As previously mentioned, in some instances this is a desirable feature to prevent the saw chain from running in one direction or another. In FIG. 12, the bottom surface 98b of shield plate 82 is sloped upward from left to right laterally of saw chain SC at an angle d to the horizontal or the plane defined by the top cutting edges $E_R$ and $E_L$ of the right and left-hand teeth $T_R$ and $T_L$, respectively, of right and left-hand cutter links $C_R$ and $C_L$, respectively. As a result, when the depth gauge of a right-hand cutter link is ground, the bottom surface 98b of shield plate 82 will contact the cutting edge $E_R$ of the right-hand cutter link at a higher level than such surface will contact the cutting edge $E_L$ of the left-hand cutter link when the depth gauge of that link is being ground. Accordingly, shield plate 82 will force indexing roller 74 higher when it contacts a right-hand cutter link than it will when it contacts a left-hand cutter link. As a result, the grinding wheel 12 will contact the depth gauge $D_R$ of the right-hand cutter link at a higher level than it will the depth gauge $D_L$ of a left-hand cutter link, thereby maintaining the depth gauges of the right-hand cutter links at less clearance than the depth gauges of the left-hand cutter links. As the saw chain cuts, this will tend to cause the left-hand cutter links $C_L$ to outcut the right-hand cutter links $C_R$, thereby tending to compensate for the tendency of the saw chain to run to the left. Of course, if a saw chain tends to run to the right while cutting, a shield plate with its bottom surface sloped in the opposite direction from that shown in FIG. 12 should be used. Also, if it is desired to maintain depth gauge clearance of the right and left-hand cutter links the same, then bottom surface 98 should be maintained parallel to the top cutting edges E of the right and left-hand cutter links.

FIG. 13 EMBODIMENT

Figure 13:
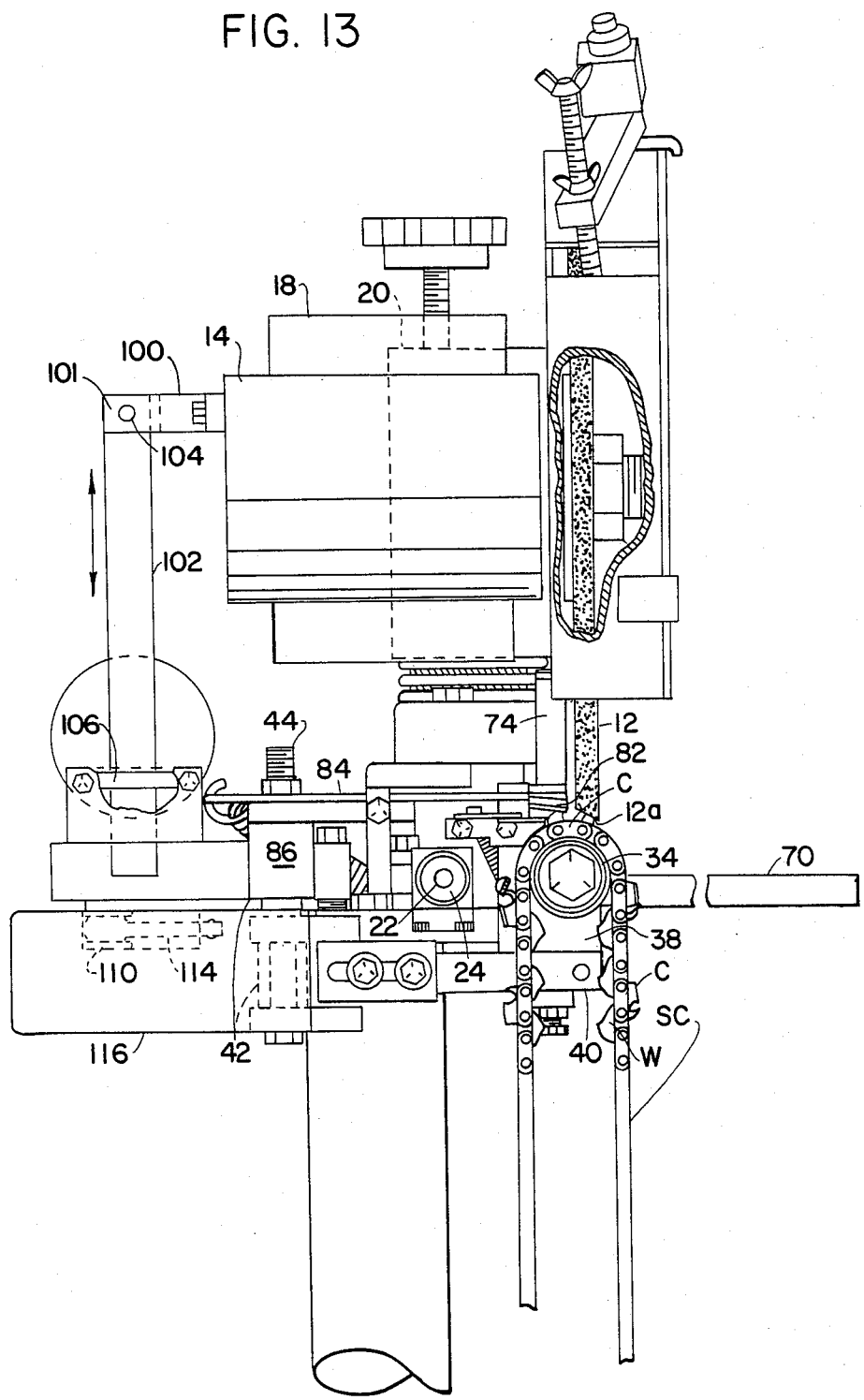
FIG. 13 is a side elevational view similar to that of FIG. 1 but showing a modified form of the grinding machine incorporating an electrical switch-actuated brake.

FIG. 13 illustrates a modification of the grinder of FIG. 1 which includes means for presetting the proper height of the grinding wheel and thus grinding surface 12a for grinding depth gauges to a desired predetermined clearance. The grinder of FIG. 13 is essentially the same grinder as that of FIG. 1 with exceptions which will be described. The reference numbers used in FIGS. 13-16 that are also used in the preceding figures refer to the same elements as found in the preceding figures.

Figure 16:
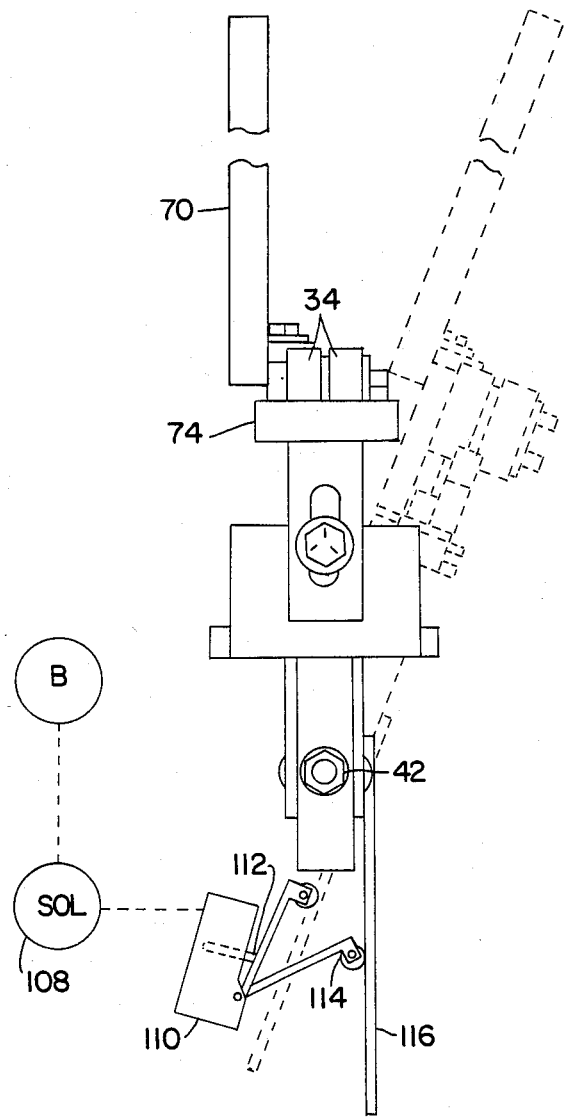
FIG. 16 is a view similar to FIG. 3 but taken along the line 16—16 of FIG. 13.

Referring to FIGS. 13 and 16, an extension member 100 is attached to a rear end portion of motor casing 14 and extends rearwardly therefrom. The extension member includes a clevis portion 101 at its rear end. The upper end of a brake arm 102 extends within clevis portion 101 and is pivoted thereto at 104. Brake arm 102 extends downwardly between a set of brake shoes 106. One of the brake shoes is connected to the plunger of a solenoid 108 (FIG. 16), actuation of which forces the connected brake shoe against brake arm 102 and an opposing brake shoe to prevent vertical movement of the arm and thus prevent pivoting movement of the connected motor and grinding wheel assembly on pivot shaft 22.

Figure 14:
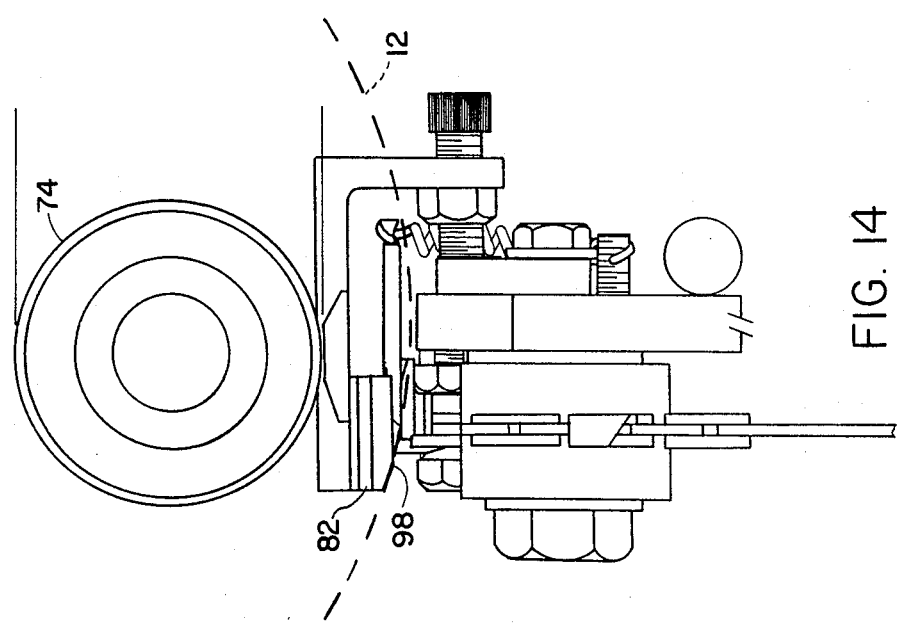

Solenoid 108 is energized by a brake switch 110 having a switch actuator 112 connected to an actuating arm 114. Arm 114 is in a position to be contacted by a rear extension 116 of carrier arm 40 rearwardly of the carrier arm pivot 42 during swinging movement of the carrier arm. More specifically, when carrier arm 40 is in its retracted position away from the grinding wheel, arm portion 116 contacts actuator arm 114 to condition switch 110 so that solenoid 108 is deenergized. However, as carrier arm 40 swings the saw chain support toward the grinding wheel to a point where shield plate 82 forces indexing roller 74 upwardly to position grinding wheel 12 in its grinding position, as shown in FIG. 14, arm extension 116 disengages actuator arm 114 to condition switch 110 for energizing solenoid 108. Solenoid 108 thus forces brake shoes 106 against the brake arm 102 to maintain the grinding wheel assembly and thus grinding wheel 12 in its elevated grinding position.

Figure 15:
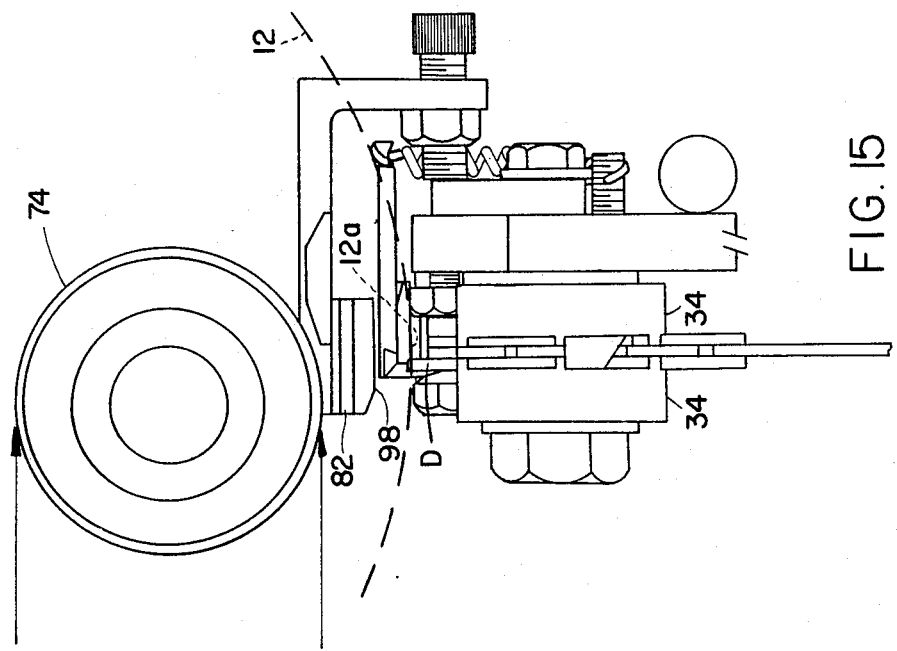
FIGS. 14 and 15 are sequential side elevational views similar to FIGS. 7-10 but of a portion of the grinding machine of FIG. 13 illustrating operation of such modification.

Thereafter, continued movement of the carrier arm 40 and its associated shield plate 82 beyond indexing roller 74, as shown in FIG. 15, to a position where depth gauge D of the cutter link engages the grinding surface 12a, does not affect the grinding position of the grinding surface. Instead, the grinding surface is maintained by the brake shoes in its grinding position.

Thus, in the FIG. 13 embodiment, indexing roller 74 coupled with the braking means serves as a means for presetting the grinding position of grinding wheel 12 before grinding occurs rather than during grinding, as is the case with the embodiment of FIG. 1. As soon as carrier arm 40 swings the chain support rollers 34 inwardly toward the grinding surface and out from beneath indexing roller 74, the resilience of the shield arm 84 causes the shield plate 82 to rise out of contact with the cutter tooth so that there is no contact between the cutter tooth and the shield plate as grinding occurs. As a result, there is minimum frictional contact between the shield plate and the cutter tooth, such contact occurring only momentarily while the cutter tooth briefly passes beneath indexing roller 74.

When the carrier arm 40 is swung back to its retracted position, it must again pass beneath indexing roller 74. However, because the carrier arm 40 and the shield plate support arm 84 are not tied together, chain support rollers 34 and the supported cutter link can pass beneath roller 74 on the return before shield plate 82 so that shield plate 82 will not necessarily be forced down against the top of the cutter tooth of the supported cutter link during the return of the shield plate and the the support rollers 34 to their respective retracted positions.

After the saw chain support rollers 34 have passed beneath indexing roller 74 in their return to their retracted positions, carrier arm extension 116 again contacts the switch actuator arm 114 to deenergize solenoid 108. This releases the brake and returns the grinding wheel to its lowered, inactive position.

From the foregoing description with reference to FIGS. 14 and 15, it will be apparent that the grinding surface 12a of grinding wheel 12 is offset to the right of the vertical centerline of indexing roller 74 as viewed in FIGS. 14 and 15. This should be contrasted with the arrangement of these elements in FIGS. 7–10 where the lowermost grinding surface 12a is aligned directly beneath the centerline of indexing roller 74. In any case, it will be clear from FIG. 15 that there is no contact with the cutter tooth while its associated depth gauge is ground. Furthermore, there is no contact between the indexing roller 74 and the shield plate 82 during such grinding operation. Thus, indexing roller 74 is only used to preset the grinding position of grinding wheel 12 and is not used to hold such grinding wheel in its grinding position, unlike the FIG. 1 embodiment.

It will be apparent from the discussion of the FIG. 13 embodiment that, if desired, the shield support arm 84 could be used to actuate the brake switch 110 rather than the rearward extension 116 of carrier arm 40.

From the foregoing description of the embodiments of FIGS. 1 and 13, it will be apparent that in both cases the carrier arm moves the saw chain cutter link to position the depth gauge of such cutter link beneath the grinding wheel and in grinding engagement with the grinding surface 12a. However, it will also be apparent to those skilled in the art that the same result could be accomplished by moving the grinding wheel assembly toward and away from the saw chain support to accomplish the same result. In either case, there is relative movement between the grinding wheel and the saw chain support along a predetermined path to position a selected cutter link so that its depth gauge grindingly engages the grinding wheel. Also, the grinding wheel and saw chain support move relative to one another in a direction normal to such path to correctly position the grinding surface 12a to grind the desired clearance on the depth gauge. Regardless of whether the required transverse and normal movements described are accomplished through actual movement of the saw chain support or actual movement of the grinding wheel, the shield and depth gauge clearance compensation features would still be operable.

Having illustrated and described the principles of my invention by reference to a preferred embodiment and several possible modifications thereof, it should be apparent to those persons skilled in the art that the preferred embodiment may be modified without departing from such principles. I claim as my invention all such modifications as come within the true spirit and scope of the following claims.

I claim:

1. A saw chain grinding machine for grinding the depth gauges of saw chain cutter links each having both a front depth gauge and a rear cutter tooth, said machine comprising:

grinding means including a grinding surface;

carrier means for mounting a saw chain with a cutter link in predetermined position for grinding the depth gauge thereof, said carrier means and grinding means being movable relative to one another in a predetermined path to move said cutter link depth gauge toward and away from said grinding means;

mounting means mounting said carrier means and said grinding means for generally vertical relative movement therebetween;

indexing means positioned along said path and cooperable with the cutter tooth to induce generally vertical relative movement between said grinding means and said carrier means when said carrier means is moved along said path to determine the grinding position of said grinding surface relative to the depth gauge;

and shield means positioned along said path for engagement with the top of the cutter tooth and the indexing means to prevent direct contact between said indexing means and said cutter tooth upon said relative movement along said path between said grinding means and said carrier means.

2. A machine according to claim 1 wherein said mounting means mounts said grinding means and said indexing means for generally vertical movement, and linkage means interconnecting said indexing means and said grinding means such that contact of said indexing means with said shield means induces generally vertical movement of said grinding means to position said grinding surface in its grinding position.

3. A machine according to claim 1 wherein said shield means is mounted for movement along said path between said carrier means and said indexing means and includes pickup means engageable with said carrier means upon movement of the carrier means along said path, such that the shield means moves with the carrier means along at least a portion of the path and into contact with said indexing means.

4. A machine according to claim 1 wherein said carrier means, shield means, and indexing means are aligned along said path with said shield means normally between said indexing means and said carrier means, and means for moving said shield means with said carrier means along said path into contact with said indexing means.

5. A machine according to claim 1 wherein said shield means is movable with said carrier means along said path and toward said indexing means, shield mounting means yieldingly mounting said shield means for generally vertical movement between a first raised position above the top of said cutter tooth and above a lowermost indexing surface of said indexing means and a second lowered position interposed between and in contact with said indexing surface and the top of said cutter tooth, said shield means being movable to said second position upon movement of the carrier means along said path beneath said indexing means to induce said relative vertical movement.

6. A machine according to claim 5 wherein said mounting means mounts said grinding means and indexing means for generally vertical movement relative to the carrier means, said shield means being sized and said shield means and indexing means being relatively positioned such that upon movement of the carrier means with the shield means toward the indexing means, contact of the shield means with the indexing means first forces the shield means downwardly against the top of the cutter tooth and then forces the indexing means upwardly to move the grinding surface to said grinding position.

7. A machine according to claim 6 wherein the indexing means comprises a roller member and said shield means comprises a plate member.

8. A machine according to claim 7 wherein said roller member and said grinding means are rigidly interconnected for movement together vertically and wherein said shield plate member and said carrier means are mounted on separate pivot arms for pivoting movement about a common upright axis, said shield pivot arm comprising a vertically resilient member.

9. A machine according to claim 1 wherein each cutter link has a cutter tooth with a top cutting edge and a top surface which slopes downwardly in a direction rearwardly from said cutting edge at a backslope clearance angle measured from an imaginary line parallel to the bottom edge of the link and wherein a bottom surface of said shield means contacts the top surface of said cutter tooth to define a compensating angle with said top surface which is greater than said back slope angle such that said indexing means operates automatically to increase the clearance between the top cutting edge of said cutter tooth and the depth gauge as the length of said cutter tooth decreases.

10. A machine according to claim 9 wherein the bottom surface of said shield means is inclined upwardly at an angle to said imaginary line in a direction from the front to the back of the cutter tooth to at least partially define said compensating angle.

11. A machine according to claim 9 wherein said carrier means defines a convexly curved saw chain support surface in the region where the cutter link is supported to be ground and includes a stop means for determining the grinding position of said cutter link on said support surface, said stop means being adjustable so as to dispose the cutter link on said support surface at an angular disposition to the bottom surface of said shield plate and thereby at least partially define said compensating angle.

12. A machine according to claim 9 wherein said shield means includes a bottom surface extending at a slight angle to the horizontal in a direction laterally of a saw chain supported on said carrier means whereby the cutter teeth of the right-hand cutter links of the saw chain engage said surface at a different elevation than the cutter teeth of the left-hand cutter links of the saw chain to be ground such that the depth gauges on the right-hand cutter links are ground to a different clearance than the depth gauges on the left-hand cutter links.

13. A saw chain grinding machine for grinding the depth gauges of saw chain cutter links having cutter teeth adjacent their depth gauges, each such cutter tooth having a top surface sloping downwardly at a back slope angle rearwardly from its said top cutting edge and a clearance between such cutting edge and the top of the depth gauge, said machine comprising:
grinding means including a grinding surface,
carrier means for mounting a saw chain with the depth gauge of a selected cutter link in grinding position thereon, said carrier means and grinding means being mounted for relative movement for moving the cutter link toward and away from said grinding means and thereby the depth gauge into grinding relationship with said grinding surface,
indexing means cooperable with the top of said cutter tooth upon movement of the selected cutter link on said carrier means toward said grinding means to adjust the level of said grinding surface relative to the level of said carrier means and thereby determine the clearance between the top cutting edge and the depth gauge,
and clearance adjustment means cooperable with said indexing means and the top of said cutter tooth operable automatically to increase said clearance as said cutter tooth becomes shorter.

14. A machine according to claim 13 wherein said indexing means includes an indexing surface engageable by the top of said cutter tooth, said clearance adjustment means including means causing the top of said cutter tooth to contact said indexing surface at a compensating angle greater than said back slope angle.

15. A machine according to claim 14 wherein said clearance adjustment means includes means on said carrier means for disposing the selected cutter link at an angle relative to said indexing surface and thereby define at least a portion of said compensating angle.

16. A machine according to claim 14 wherein said indexing surface is inclined upwardly in a direction rearwardly from the top cutting edge of said cutter tooth relative to the bottom edge of the cutter link to at least partially define said compensating angle.

17. A saw chain grinding machine for grinding the depth gauges of saw chain cutter links having cutter teeth adjacent their depth gauges with some of the cutter teeth being of right-hand configuration and others of such teeth being of left-hand configuration along the chain, and with each cutter tooth having a top cutting edge at a level above the top of its associated depth gauge to define a clearance therebetween,
grinding means including a grinding surface,
carrier means for mounting a saw chain with the depth gauge of a selected cutter link in a grinding position thereon, the carrier means and grinding means being mounted for relative movement therebetween for moving the cutter link toward and away from the grinding means and thereby the depth gauge into grinding relationship with the grinding surface,
indexing means cooperable with the top of the cutter tooth upon movement of the selected cutter link toward the grinding means to adjust the level of the grinding surface relative to the level of the carrier means and thereby determine the clearance between the depth gauge and top of the cutter tooth, and clearance compensating means cooperable with the indexing means and the tops of the alternating right and left-hand cutter teeth for automatically adjusting the relative positions of the grinding surface and depth gauges to grind the depth gauges of the right-hand cutter teeth to a different clearance than the depth gauges of the left-hand cutter teeth relative to the tops of their respective cutter teeth.

18. A machine according to claim 17 wherein said clearance compensating means includes a surface contactable by the tops of the cutter teeth during said movement and cooperable with said indexing means, said surface sloping in a direction laterally of said saw chain so that the surface contacts the tops of the right-hand cutter teeth at a different level than the left-hand cutter teeth.

* * * * *